United States Patent
Johnson

(10) Patent No.: US 12,304,523 B2
(45) Date of Patent: May 20, 2025

(54) METHOD AND APPARATUS FOR TRAJECTORY SMOOTHING IN AUTONOMOUS VEHICLE CONTROL

(71) Applicant: DYNAMIC MAP PLATFORM NORTH AMERICA, INC., Livonia, MI (US)

(72) Inventor: David K. Johnson, Canton, MI (US)

(73) Assignee: DYNAMIC MAP PLATFORM NORTH AMERICA, INC., Livonia, MI (US)

( * ) Notice: Subject to any disclaimer, the term of this patent is extended or adjusted under 35 U.S.C. 154(b) by 278 days.

(21) Appl. No.: 18/072,837

(22) Filed: Dec. 1, 2022

(65) Prior Publication Data

US 2023/0174099 A1 Jun. 8, 2023

Related U.S. Application Data

(60) Provisional application No. 63/285,839, filed on Dec. 3, 2021.

(51) Int. Cl.
*B60W 60/00* (2020.01)

(52) U.S. Cl.
CPC ....... *B60W 60/001* (2020.02); *B60W 2520/06* (2013.01); *B60W 2520/10* (2013.01)

(58) Field of Classification Search
CPC .......... B60W 60/001; B60W 2520/06; B60W 2520/10
See application file for complete search history.

(56) References Cited

U.S. PATENT DOCUMENTS

| | | | |
|---|---|---|---|
| 2012/0116678 A1* | 5/2012 | Witmer | G09B 29/00 702/5 |
| 2016/0003629 A1* | 1/2016 | Watanabe | G01S 5/017 701/472 |
| 2019/0121363 A1* | 4/2019 | Roth | G01C 21/3492 |
| 2020/0132818 A1 | 4/2020 | Dussan et al. | |
| 2023/0150533 A1* | 5/2023 | Song | B60W 50/14 701/26 |
| 2024/0312059 A1* | 9/2024 | Omar | G01S 17/89 |

OTHER PUBLICATIONS

Li, Xiaohui, Real-Time Trajectory Planning for Autonomous Urban Driving: Framework, Algorithms, and Verifications, Apr. 2016 (Year: 2016).*

Extended European Search Report issued in corresponding European Patent Application No. 22211117.1 dated Mar. 20, 2023.

(Continued)

*Primary Examiner* — Scott A Browne
*Assistant Examiner* — Terry C Buse
(74) *Attorney, Agent, or Firm* — SQUIRE PATTON BOGGS (US) LLP

(57) ABSTRACT

A practical application of autonomous vehicle control couples vehicle trajectory and road curvature, taking advantage of their interdependency. As a result, if cameras or other lane-informing sensors go out in an autonomous vehicle, it still is possible to use GPS signals and the curvature to keep vehicles safely in their lanes while drivers can be alerted and can decide how to proceed (that is, by continuing autonomous vehicle control, or taking over operation of the vehicle manually).

20 Claims, 8 Drawing Sheets

(56) References Cited

OTHER PUBLICATIONS

Xiaohui Li et al., "Real-Time Trajectory Planning for Autonomous Urban Driving: Framework, Algorithms, and Verifications", IEEE/ASME Transactions on Mechatronics, vol. 21, No. 2, Apr. 2016, pp. 740-753.

Office Action dated Mar. 22, 2024 issued in corresponding Canadian Patent Application No. 3, 177,557; four pages.

David H. Douglas et al., "Algorithms for the Reduction of the Number of Points Required to Represent a Digitized Line or its Caricature", The Canadian Cartographer, vol. 10, No. 2, Dec. 1973, pp. 112-122.

Richard G. Baraniuk et al., "Model-Based Compressive Sensing", IEEE Transactions on Information Theory, arXiv:0808.3572 [cs.IT], Dec. 9, 2009, pp. 1-20.

NOAA Science Advisory Board, "Compressive Sensing", SAB Issue Papers for Discussion, Aug. 2016, 5 pages, accessed at: https://sab.noaa.gov/wp-content/uploads/2021/08/compressive-sensing_Joseph_Final.pdf.

Bo Liu et al., "A Vector Line Simplification Algorithm Based on the Douglas-Peucker Algorithm, Monotonic Chains and Dichotomy", ISPRS International Journal of Geo-Information, vol. 9, No. 251, Apr. 17, 2020, pp. 1-14.

Guangliang Chen et al., "Compressed sensing and dictionary learning", Proceedings of Symposia in Applied Mathematics, vol. 73, 2016, pp. 201-241.

\* cited by examiner

METHOD AND APPARATUS FOR TRAJECTORY SMOOTHING IN AUTONOMOUS VEHICLE CONTROL

CROSS-REFERENCE TO RELATED APPLICATIONS

The present application claims the benefit of U.S. Provisional Application No. 63/285,839, filed Dec. 3, 2021, and incorporates the entirety of that application by reference.

FIELD OF THE INVENTION

Aspects of the present invention relate to a method and system to provide a vehicle trajectory with curvature properties that are desirable for drivability. In one aspect, the trajectory curvature may be piece-wise smooth. In another aspect, user defined properties enable adaptation of constraints to user needs.

BACKGROUND OF THE INVENTION

There have been numerous curvature calculations from a trajectory. As an example, there are autonomous vehicle control systems which engage in inferences to adapt a vehicle path along a roadway, which may have a number of curves, to reach a destination.

One problem with making curvature calculations is that there can be substantial ambiguity in the definition of centerlines on lanes, for a variety of reasons. For example, the left and right delineators of lanes often are not parallel. As another example, there can be other artifacts, or other items in lanes, that an autonomous vehicle control system could identify erroneously as either a lane delineator or a lane center. As a result, the geometric center of a lane can be difficult to define.

One prior approach has been to calculate curvature along a trajectory, smoothing the curvature, and then delivering it. As a result of altering the curvature calculation in this manner, curvature cannot function as a faithful input to an autonomous vehicle control system to reproduce trajectory. Rather, in this prior approach, curvature is only useful as an indicator. If the cameras or other lane-informing sensors on an autonomous vehicle were to go out, and users tried to use the delivered curvature to control autonomous, vehicles, the vehicles would drive out of their lanes.

In addition, finding a route that stays within a reasonable margin of the left and right delineators still can yield a very large number of candidate trajectories. Depending on how those trajectories are chosen, they may be extremely jittery (too many changes per unit time), leading to an uncomfortable ride. Attempts to decrease the number of changes per unit time can make the candidate trajectory inaccurate. For example, a vehicle following such an inaccurate trajectory could veer outside the lane delineators, which would be dangerous, leading to potential collisions with other vehicles or to other potentially calamitous situations.

It would be desirable to constrain route finding sufficiently to provide a smoother ride, within lane delineators, to provide a safer, more comfortable ride.

SUMMARY OF THE INVENTION

Embodiments of the invention provide an algorithm to run in conjunction with generation of a high definition (HD) map, to facilitate autonomous driving, including operation of an autonomous vehicle. Aspects of the algorithm calculate trajectories representing the center of a lane (a recommended path for a vehicle to follow). In some aspects, the trajectories take into account left and right paint line delineators, kinematics of a vehicle, and various optimality conditions including but not limited to curvature, rate of change of curvature, and other user defined properties such as minimum path length, minimum energy use, minimal cross slope, or smoothest curvature. Aspects of the algorithm form an optimization problem to minimize variability of rate of change of curvature along a trajectory that travels near the center of the volume defined by the left and right delineators.

Aspects of the present invention result from simultaneous consideration of vehicle kinematics and modern signal processing techniques such as compressive sensing, which reduce data footprint while providing desirable trajectories. As a consequence, the safest and most drivable path on a road may be codified in an HD map so that vehicles may be aware of such a path. The path can be adapted to user needs via additional prescribed constraints such as the ones mentioned above.

BRIEF DESCRIPTION OF THE DRAWINGS

Aspects of the present invention now will be described in detail with respect to the accompanying drawings, in which.

DETAILED DESCRIPTION OF EMBODIMENTS

Aspects of the present invention present a practical application of autonomous vehicle control by coupling vehicle trajectory and road curvature in a novel and inventive way. This practical application solves a "chicken and egg" type problem by intimately coupling trajectory and curvature at the outset, taking advantage of interdependency between trajectory and curvature.

One consequence of this novel approach is that users can obtain lane centerlines with the users' own desired properties, particularly as regards curvature.

With the approach described herein, trajectory and curvature by design are kinematically faithful to one another because of their initial intimate coupling. As a result, in autonomous vehicles implementing the inventive approach, if the cameras or other lane-informing sensors go out, it still is possible to use GPS signals and the curvature, and remain confident that vehicles can remain safely in their lanes while drivers can be alerted and can decide how to proceed (that is, by continuing autonomous vehicle control, or taking over operation of the vehicle manually).

By way of introduction, a trajectory may be defined by an ordered sequence of three-dimensional points. These points may be either a finely sampled trajectory (such as one-meter spaced points), sparsely sampled delineator control point sequences, or high-density samples of positions and intensity values from point cloud data. Additionally, it is possible to specify boundary conditions for position, heading and curvature in any combination at both leading and trailing ends of the trajectory.

There are various databases which contain road features, to varying levels of detail. For example, the National Institute of Standards and Technology (NIST) has a Road Network Database. The applicant has its own Road Features Database (RFDB). There are other such road feature databases, directed to autonomous driving applications, as ordinarily skilled artisans will appreciate.

If left and right lane delineators are parameterized simultaneously on a variable $t \in [0,1]$ then a geometric centerline of a vehicle lane may be defined as follows:

$$P_{ctr}(t) = \frac{1}{2}[P_{left}(t) + P_{right}(t)] \quad (1)$$

where $P_{ctr}$, $P_{left}$, $P_{right} \in R^3$ are relative Cartesian coordinates of the geometric centerline of a lane and the left and right delineators, respectively. In the context of vehicle trajectory, Cartesian coordinates may be referred to as Easting, Northing, and Up (ENU), respectively. The trajectory may be a function of time t, normalized to be t E [0,1], so that t=0 is at the beginning of the trajectory, and t=1 is at the end of the trajectory. For example:

$$P_{ctr(t)} = \begin{bmatrix} E(t) \\ N(t) \\ U(t) \end{bmatrix} \quad (2)$$

Figure 1A:
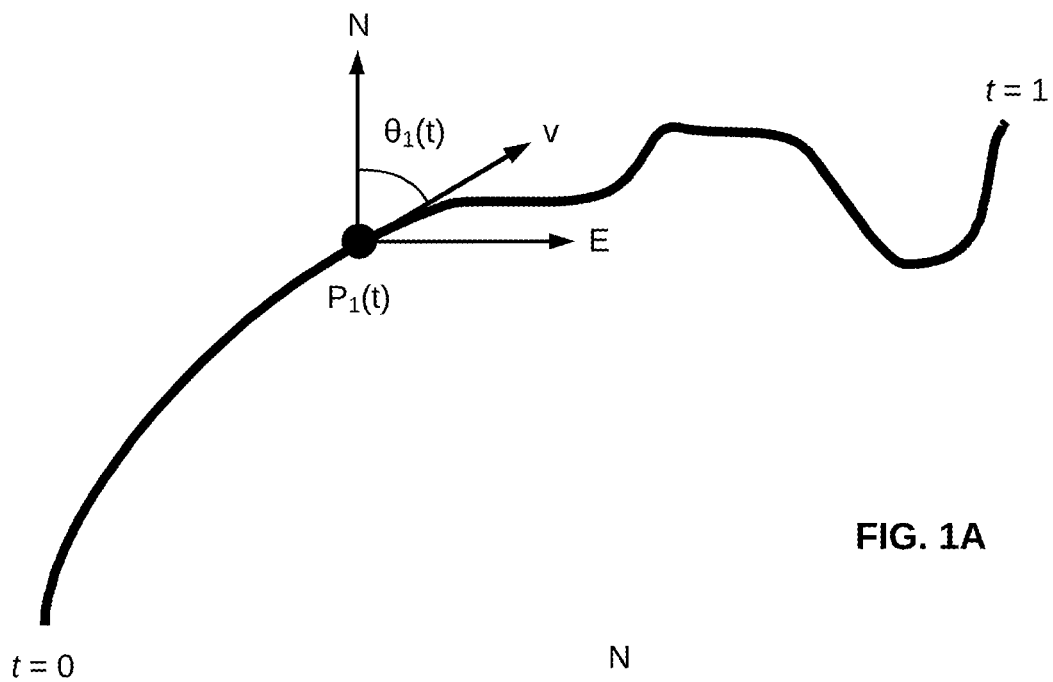
FIGS. 1A and 1B represent a path for trajectory determination, and points along that path.
Figure 1B:
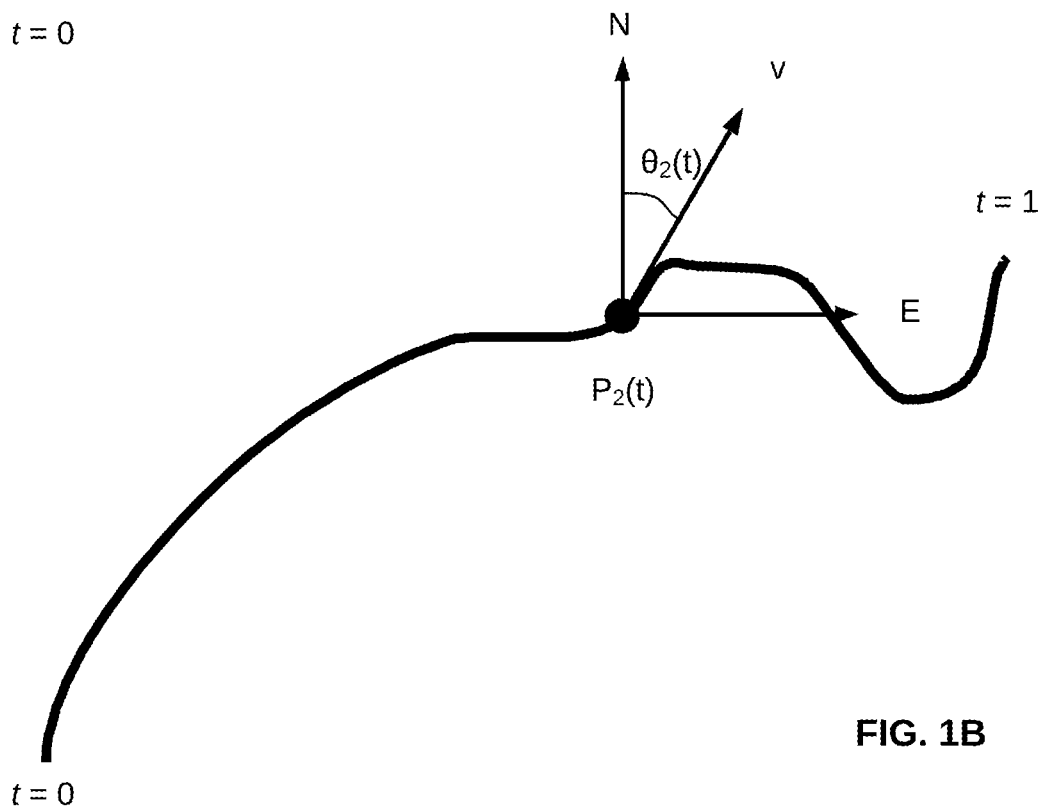

FIGS. 1A and 1B show a sample trajectory in the ENU coordinate system. Looking at these respective figures, the trajectory includes trajectory heading angles $\theta_1(t)$, $\theta_2(t)$, tangent velocity vectors $v_1$, $v_2$, and points on a curve $P_1(t)=[E_1(t), N_1(t), U_1(t)]$, $P_2(t)=[E_2(t), N_2(t), U_2(t)]$, during the previously-indicated normalized time duration $t \in [0,1]$. As FIGS. 1A and 1B show, as a vehicle moves along the trajectory, the vehicle will be at different points along the trajectory. The trajectory heading angle $\theta(t)$ will change, depending on the vehicle location along the trajectory.

Figure 2:
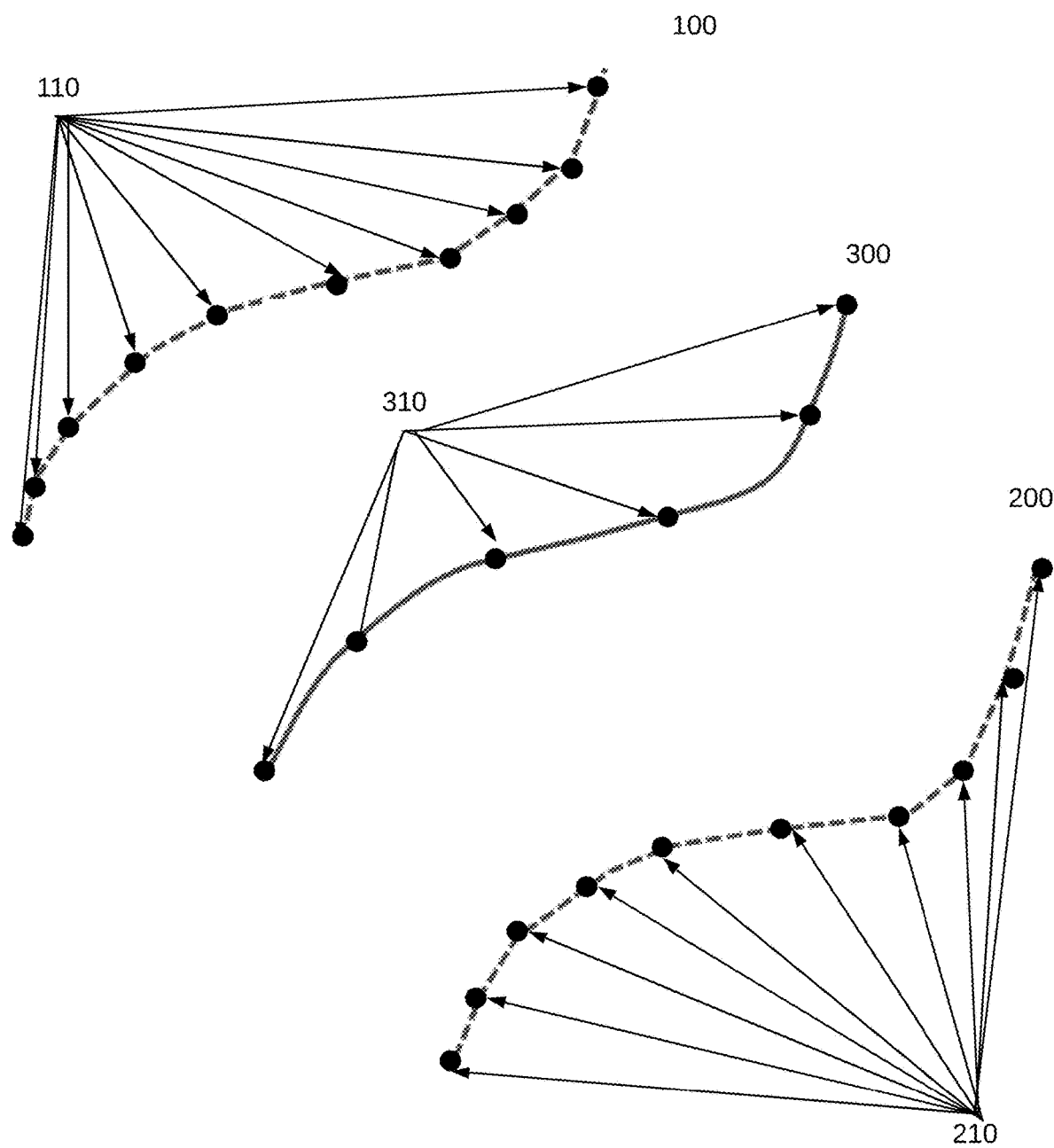
FIG. 2 shows a representation of a desired kinematic trajectory and accompanying left and right lane delineators.

FIG. 2 shows an exemplary lane and trajectory configuration, with a left lane delineator 100 and points 110 along that delineator; a right lane delineator 200 and points 210 along that delineator; and a desired kinematic trajectory 300 and points 310 along that trajectory. The data in FIG. 2 for a given trajectory can come from a road feature database of the types discussed above. In particular, the data for lane delineators may be provided. A trajectory along a centerline between the lane delineators may be provided, or it may be part of the road feature database. While lane delineators can be a standard width (for example, for eight-foot wide lanes), there may be roads with narrower or wider lanes, depending on a number of criteria with which ordinarily skilled artisans will be familiar. For example, different countries may have different lane widths, or may measure their lane widths in meters instead of inches. Different areas (e.g. rural v. urban) also may have different lane widths for various reasons. Even along a given thoroughfare, lane widths may vary depending upon terrain, vehicle type(s) accommodated, road construction, and other circumstances.

In an embodiment, the data along the delineators or the centerline may be provided in one meter spaced increments. For a trajectory containing one or more curves, that spacing, within a reasonable range of vehicle speed, can yield sufficiently dense data to enable reasonable control of a vehicle through one of those curves, even through a hairpin curve. For straight passages, and possibly for passages with only gentle or slight curves, less dense data can suffice. Aspects of the present invention relate to ameliorating the effect of dense data on frequency of steering control and consequent roughness of ride.

At any given point in time, a heading angle, $\theta(t)$, (angle between the tangent velocity vector v at any point and the Northing axis as shown in FIGS. 1A and 1B) satisfies elementary kinematics, as follows:

$$\frac{d}{dt}E(t) = v(t)\sin(\theta(t)), \quad (3)$$

$$\frac{d}{dt}N(t) = v(t)\cos(\theta(t)), \quad (4)$$

$$\tan(\theta) = \frac{\frac{d}{dt}E}{\frac{d}{dt}N} \quad (5)$$

where $v(t)$ is the instantaneous velocity along the trajectory. An arc-length L(t) along the trajectory may be given by $$L(t) = \int_0^t \sqrt{\left(\frac{dE}{d\tau}\right)^2 + \left(\frac{dN}{d\tau}\right)^2}\, d\tau \quad (6)$$

Embodiments according to aspects of the invention output a sequence of three-dimensional points sampled along a newly-defined trajectory at a specified resolution (such as one-meter points). The resulting trajectory has a smooth curvature that integrates kinematically via equations which will be discussed below.

In a right-handed coordinate system, a trajectory curvature $\kappa(t)$ may be defined by the relationship:

$$\frac{d\theta}{dt} = -v(t)\kappa(t) \quad (7)$$

where $$\frac{d\theta}{dt}$$

is a change of heading with time;

$v(t)$ is velocity as a function of time; and $\kappa(t)$ is curvature.

The radius of the curvature $\kappa(t)$ would be $R(t)=1/\kappa(t)$.

In an embodiment, a curvature $\kappa(s)$ may be defined by the relationship:

$$\frac{d\theta}{ds} = -v(t)\kappa(t) \quad (7')$$

where $$\frac{d\theta}{ds}$$

is a change of heading with respect to arc-length;
s is arc-length; and
κ(s) is curvature.

Horizontal traversal of the trajectory may be defined via simultaneous solution of a pair of initial value problems, as follows:

$$E(t) = E_0 + \int_o^t v(\tau)\sin(\theta(\tau))d\tau \quad (8)$$

$$N(t) = N_0 + \int_o^t v(\tau)\cos(\theta(\tau))d\tau \quad (9)$$

where $E_0$, $N_0$ are the coordinates for the Easting and Northing coordinates of the starting points on the trajectory.

Equations 7, 8, and 9 demonstrate a relationship among curvature, heading, and trajectory. Looking at vehicle operation, curvature may be proportional to steering wheel angle, which in turn controls the angle of vehicle wheels with respect to the vehicle, and hence the time rate of change of heading as the vehicle moves. Because of this relationship, curvature has been an input signal for a control system for autonomous vehicle control.

From the foregoing equations, it can be appreciated that even small changes in curvature, over a sufficiently small increment, could impart large changes in trajectory, depending on the velocity. When a vehicle is moving along a highway at speed, κ(t) may be small (relatively nonexistent on a straight stretch of highway, and relatively small around gentle curves), but v(t) can be relatively large. Frequent control interventions at small distance increments may accomplish little in terms of maintaining the vehicle near the centerline, but can cause large numbers of oscillations and the consequent undesirable roughness of ride.

In contrast, on sharp curves, such as hairpin curves in hilly or mountainous terrain, relatively steep curves on highways, or on entrance/exit ramps, κ(t) may be relatively large, but v(t) may be quite a bit smaller. Both circumstances can yield similar values for dθ/dt. In the case of a hairpin or relatively steep curve, however, more frequent control is going to be necessary in order to maintain the vehicle near the centerline.

Figure 3A:
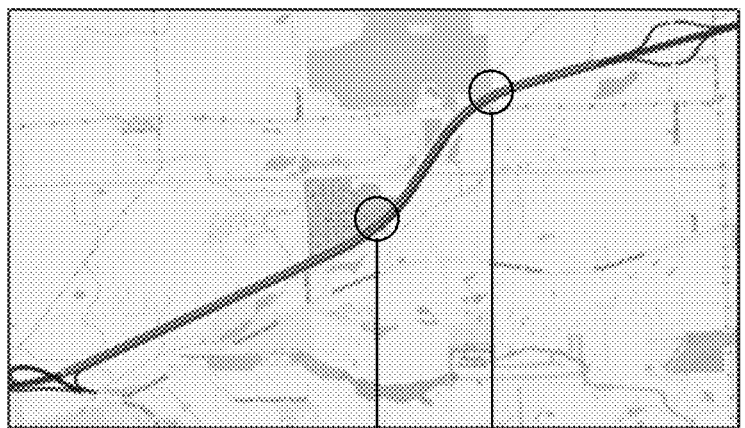
FIGS. 3A-3C depict the nature of steering corrections and their effects on trajectory and ride smoothness.
Figure 3B:
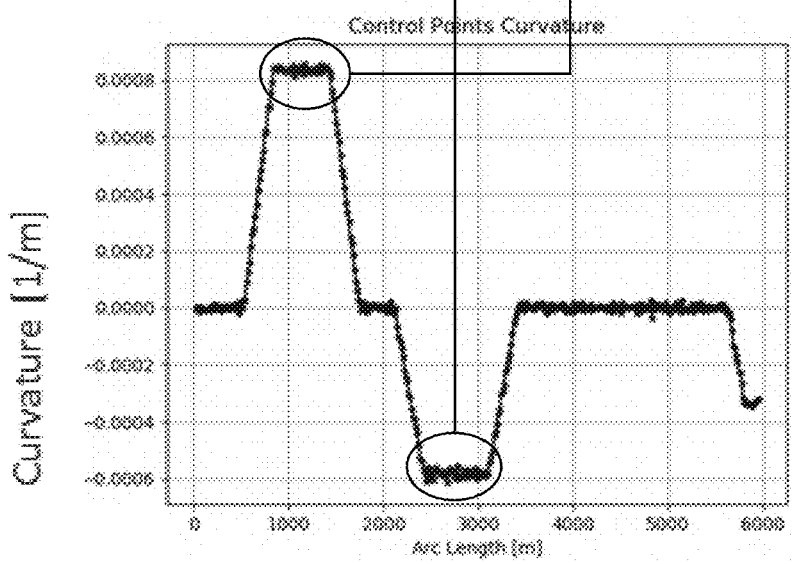

FIG. 3A shows an example of a route with some curves in it. FIG. 3B shows examples of oscillations at points of curvature along the trajectory. As noted earlier, providing a large number of points along a relatively gentle curve or straight section of road to control vehicle movement, essentially relying just on raw, or directly computed curvature, can result in severe oscillations and an unacceptably rough ride.

Figure 3C:
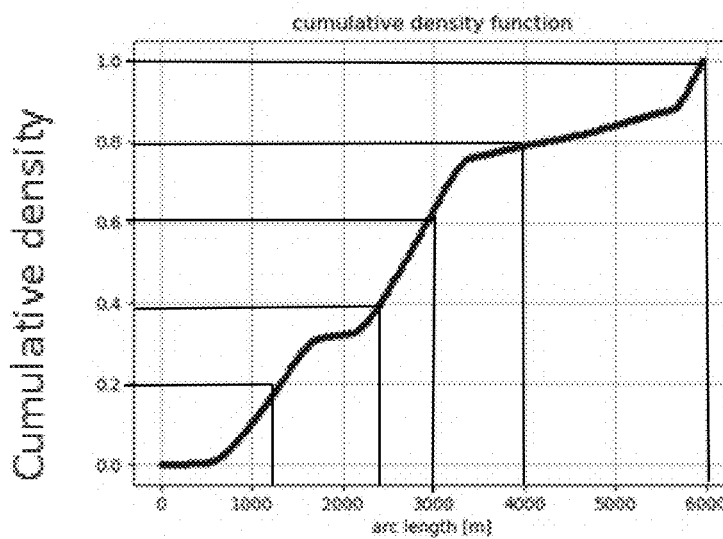

FIG. 3C shows an example of a mapping of a cumulative density function computed for the trajectory shown in FIG. 3A. The mapping is a function of arc length. In an embodiment, this cumulative density function may be sampled uniformly in the density axis to determine to which t values these samples correspond, as FIG. 3C shows. Taking uniform samples along the density axis can yield ordered points that are more concentrated in locations of high curvature, and less concentrated in locations of low curvature. Another way of looking at this is that taking samples at uniform spacing along the density axis can drive variable spacing of points along the trajectory. In this fashion, a trajectory can be provided that will have the best curvature within a tolerance of the geometrical centerline.

By considering spacing of cumulative density, it is possible to consider variable spacing of points along a trajectory, and thus provide a number of control points that keep a vehicle acceptably close to a lane centerline, while reducing a number of resulting oscillations along those control points. Accordingly, FIG. 3C shows equal spacing between cumulative density points, with differences in arc lengths (and hence curvature) between adjacent cumulative density points. This type of sampling scheme, with more dense data in sharper turns and less dense data on straight portions and shallower turns, yields variable spacing of data in different parts of a trajectory, and provides better control than a linear smoothing scheme, for example, for at least two reasons. First, it is possible to avoid the just-mentioned oscillations and consequent rough ride that result from too much data and too many changes in too short a period of time. Second, it is possible to ensure that appropriate amounts of data are available, such as for rounding a curve, especially a sharp curve. The consequences of inadequate amounts of data can cause a vehicle to veer away from a lane centerline, perhaps dangerously so.

Figure 4:
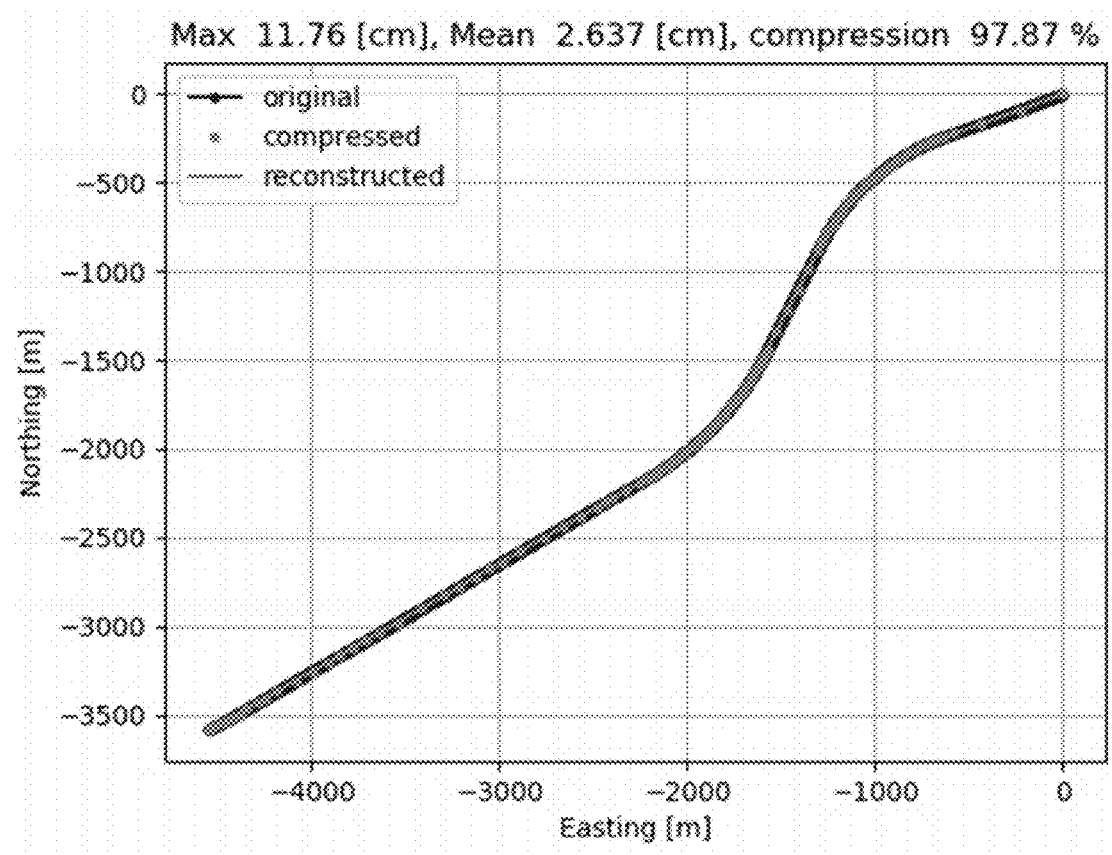
FIG. 4 depicts trajectory control in accordance with an embodiment.

FIG. 4 shows an example of data sparsity and data density, with lower density (data sparsity) in regions of lower curvature (including, for example, straight stretches of roadway) and higher density (data density) in regions of high curvature (including, for example, sharp curves, hairpin turns, and the like).

Figure 5:
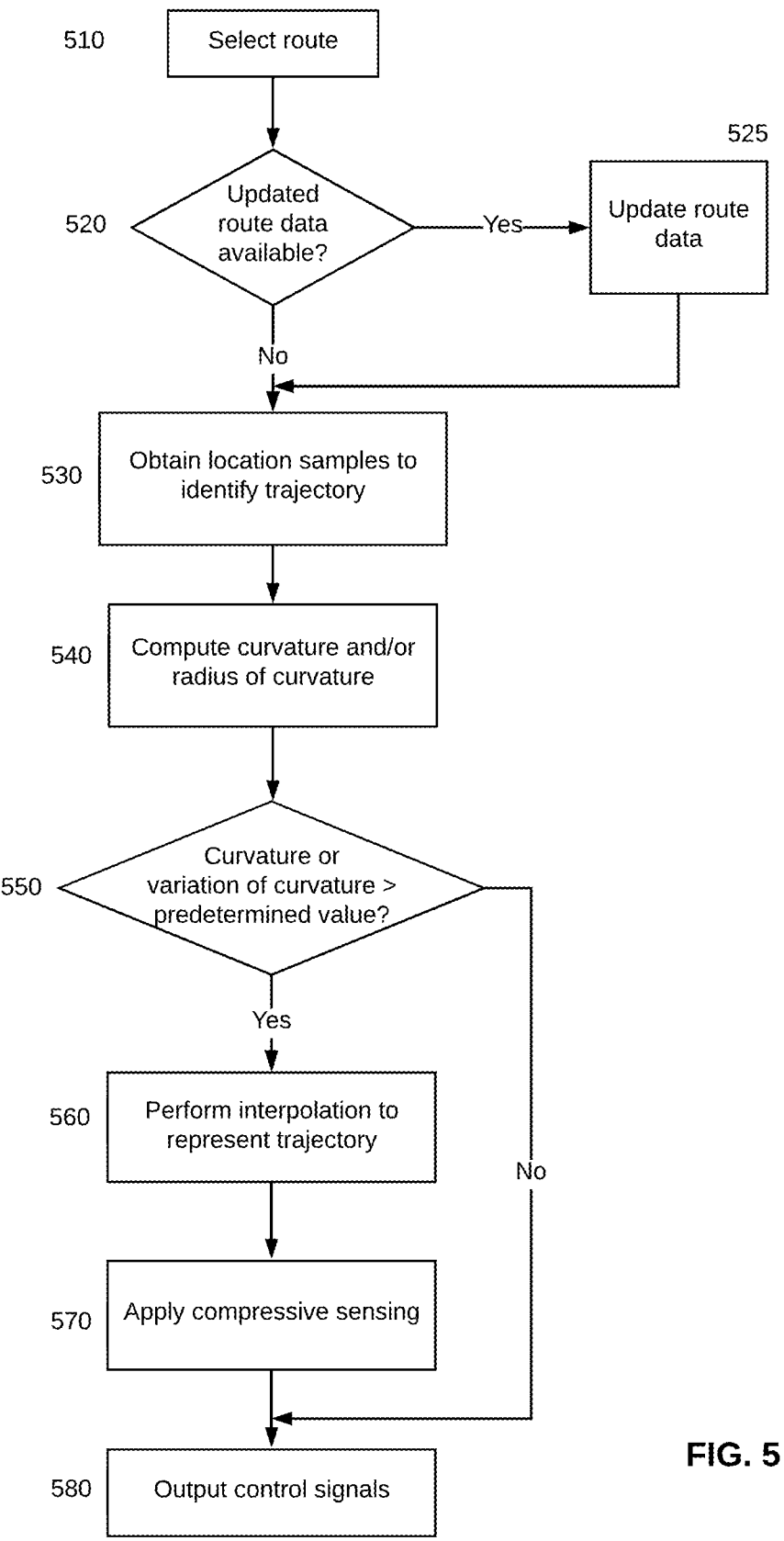
FIG. 5 is a flow chart showing aspects of the present invention according to an embodiment.

FIG. 5 is a high-level flow chart depicting generally how techniques according to aspects of the present invention can be applied to provide smoother vehicle control. In FIG. 5, at 510 a route is selected. As ordinarily skilled artisans will appreciate, routes can vary widely in terms of length, terrain, curves, and the like. At 520, a check is made to see whether there are any updates to current data for the route. If so, at 525 the route data is updated, and flow proceeds to 530. If not, flow also proceeds to 530, at which location samples from the databases may be retrieved to identify a trajectory for the vehicle. At 540, curvature and/or radius of curvature may be computed for the route. At 550, a check may be made to see if the curvature or the variation in curvature exceeds a predetermined value. If not, then flow may proceed to 580, at which point control signals may be output to control the vehicle. In an embodiment, flow may proceed to 570, where compressive sensing may be performed.

If the curvature or variation in curvature is more than a predetermined value, then at 560 interpolation may be performed to represent vehicle trajectory. As noted earlier, various roadway databases may provide data at 15 meter intervals, which is fine for straight roadway sections and gentle curves, but which are not sufficient for tighter curves. By determining whether the curvature or variation in curvature exceeds a predetermined value, it is possible to avoid interpolation of points along a more gently curving roadway stretch. Such interpolation provides additional control scenarios which give rise to the rough ride mentioned earlier.

After interpolation is performed, in an embodiment, at 570 compressive sensing may be performed to yield a curve, for example, resembling FIG. 4, with more dense points where there are tighter curves, and more sparse points elsewhere, in accordance with a degree of curvature encountered. Then, at 580, control signals may be output to control the path that a vehicle follows.

Following is a discussion of techniques for devising a variable spacing scheme using interpolation and compressive sensing techniques. In an embodiment, it is possible to choose a convenient value for an instantaneous velocity of the trajectory, where this instantaneous velocity may not necessarily imply the actual vehicle velocity. It can be desirable that the temporal parameter be in the interval t∈[0,1]. Accordingly, velocity may be a constant that is set to equal to an arclength of the curve: v=L(1).

Additionally, it is necessary to adhere to any specified boundary conditions for positions, headings and curvature for the leading or trailing ends of the trajectory. When not specified, the trajectory must use physically relevant natural boundary conditions. As will be discussed in more detail herein, some form of interpolation and numerical analysis will help to smooth out the points and the resulting ride. In an embodiment, B (basis) splines may be used to represent trajectories as a collection of knots, or ordered points in a domain. A spline order, along with the knots and accompanying coefficients, can be provided for later reconstruction.

In an embodiment, an algorithm performs the calculation with the specified input data and boundary conditions and returns the specified output. In an embodiment, the algorithm is written in Python, but ordinarily skilled artisans will appreciate that suitable algorithms may be written in other languages, including but not limited to R and Anaconda, as needed or desired. It is useful for the algorithm to be constructed so as to facilitate parallel processing of multiple trajectories being built simultaneously.

Interpolation may be thought of as having two phases. In a first phase, which may be referred to as an analysis phase, a set of input data is used to construct a useful idealized representation. From that representation, it is possible to reconstruct (or predict) other samples in regions of the domain where data is unavailable. This analysis phase involves choosing a basis for approximation and calculating weights (coefficients) with respect to the data and any other useful constraints. In a second phase, which may be referred to as a synthesis phase, the resulting weights and bases from the analysis phase are used in order to produce samples of the representation at other sites of interest. For example, one-meter sampled points may be produced from the roughly 15 meter spaced delineator control point sequences which may be stored in one of the road feature databases mentioned above.

Ordinarily skilled artisans will appreciate that there are many ways to interpolate a sequence. Often there is a tendency to attempt as exact an interpolation as possible. However, in some circumstances, including vehicle steering and control, representations that force exact matching of input data can yield unsatisfactory results when subsequently resampling the representation to new sites in between support points. Various aspects of what is termed polynomial rudeness can be responsible for yielding these unsatisfactory results.

One way of approaching and appreciating interpolation-induced problems is to recognize that, in essence, the higher the order of an approximation, the more uncontrolled wiggling it must exhibit in-between support points. For example, an Nth order polynomial with N distinct roots will have N−1 wiggles (local extrema). Up to a scale factor, the polynomial will be defined uniquely by its roots. One problem that is encountered is that constraining a curve to fit specific data points exactly leaves the curve's behavior unconstrained between those points. Where there are one-meter spaced points for a delineator or centerline from a sparse set of control points, then there will be unconstrained variability between the control points. In the context of an HD map used in autonomous driving, this unconstrained variability shows up as vertical and horizontal deviations from the intended locations, and induces oscillations in lane-width, slope, cross slope and curvature. It is these oscillations that can cause an uncomfortable ride.

A truth function, f(t), from which data may be sampled, can be approximated by the following series, $\tilde{f}(t)$:

$$f(t) \approx \tilde{f}(t) = \sum_k \psi_k(t) a_k \qquad (12)$$

This approximation $\tilde{f}(t)$ can be compared to actual data, f(t), at sample locations to see how well the approximation conforms to the data (via a data discrepancy functional, discussed below). In some instances, an integral transform with a real valued index may be used, rather than a series with a countable index. In any event, in this representation, the $\psi_k(t)$ values constitute a set of basis functions that span the solution space of interest. The indices, k, are drawn from some countable set (finite, infinite or semi-infinite). In an embodiment, these basis functions can come from families of somewhat localized functions (having compact support) such as Basis Splines, commonly referred to as B-Splines, as noted earlier.

In an embodiment, the basis functions may be chosen to restrict a sub-space of the resulting approximation such that the approximation will exhibit useful properties, for example, satisfying a particular set of dynamics (such as equations 7, 8, and 9), explicitly satisfying particular boundary conditions, exhibiting compressive sparsity ($L_1$ regularization), maintaining bounded variation (total variation, or TV regularization), having minimal energy or rates of change (Tikhonov regularization), accommodating robustness to noisy data (Gauss-Markov Estimate), or a combination of all of the above, possibly among others.

In order to prevent the undesirable (and, more importantly, potentially nonphysical) oscillations in the synthesis of resampled data, it is desirable to construct smoother, lower dimensional (lower order) representations (or fits) that lean toward subspaces with such desirable properties as a loosened requirement for explicit point matching of data and an allowance for trajectories that are sufficiently near the geometric centerline.

In an embodiment, B-Splines represent the trajectories. B-splines are a family of functions in which each function is a piecewise polynomial of degree N−1 generated by a collection of knots, or ordered points in a domain, $t_k$. In an embodiment, a recursion relation called the de Boor recursion relation may be used to generate the B-splines. B-splines may be calculated using a programming platform such as MATLAB, though programming languages such as Python, R, or others known to ordinarily skilled artisans may be used.

A first order B-spline may be defined by a set of hat functions $$B_i^1(x) = \begin{cases} 1 & \text{if } t_i \leq x < t_i + 1 \\ 0 & \text{otherwise} \end{cases}$$

It then is possible to generate higher order spline bases via the following two-term recursion relation:

$$B_i^{n+1}(x) = \frac{x - t_i}{t_{i+n} - t_i} B_i^n(x) + \frac{t_{i+n+1} - x}{t_{i+n+1} - t_{i+1}} B_{i+1}^n(x)$$

Each spline basis function is localized, so that it is nonzero for only a portion of the entire domain. B-Splines also enjoy a property called Partition of Unity, meaning that the sum of all of the basis functions on a domain is identically equal to one:

$$\sum_{k=1}^{n} B_k^p(v) = 1, \forall v \in [0,1]$$

In an embodiment, data may be fit numerically, using sampled versions of basis functions and employing a numerical method called the collocation method. For a set of N points, $(x_i, y_i)$, and a set of M pth order B-splines defined by a knot sequence, ti:

$$\begin{bmatrix} B_1^p(x_1) & \cdots & B_M^p(x_1) \\ \vdots & \vdots & \vdots \\ B_1^p(x_N) & \cdots & B_M^p(x_N) \end{bmatrix} \begin{bmatrix} a_1 \\ \vdots \\ a_M \end{bmatrix} = \begin{bmatrix} y_1 \\ \vdots \\ y_N \end{bmatrix}$$

In an embodiment, solving for the coefficients $a_k$ produces a fit.

One way to quantify a trade off between smoothness and faithfulness to the notional geometric lane centerline is to employ Least Squares Interpolation or Least Squares Regression. The Least Squares framework can provide a robust way to perform an approximation in the presence of noise, and minimize something that sometimes is referred to as a data discrepancy functional. A functional is an object whose input is a function (or vector) and whose output is a single number. Examples can include a vector distance or a trajectory arclength.

In an embodiment, minimizing the data discrepancy functional can involve a framework such as the calculus of variations or a version thereof, called functional analysis, to solve for weights of basis functions (or discretely sampled vectors). This framework can provide the necessary and sufficient criteria to guarantee that a Least Squares solution indeed minimizes the data discrepancy functional.

In an embodiment, the solutions, or approximations according to aspects of the present invention will exist in a linear vector space, which can provide a framework to assemble solutions to approximation problems.

There are a number of linear spaces that are equipped with a norm, which provides a way to measure an object's magnitude. A norm may be denoted with double vertical bars, e.g. $\|x\|$. Norms have three rules. For any vector, x, in a vector space X:

1. $\|x\| \geq 0$ for all x, with $\|x\|=0$ if and only if $x=\theta$ (where $\theta$ is the zero [null] element in X).
2. $\|x+y\| \leq \|x\|+\|y\|$ for each x and y in X. (triangle inequality)
3. $\|\alpha x\| = |\alpha| \cdot \|x\|$ for all scalars $\alpha$ and each $x \in X$ In an embodiment, it can be desired to attain a facility of a complete normed linear space, where the norm may induced by an inner product, so as to facilitate formation of a squared error measurement. Inner products satisfy four rules (axioms):

1. $\langle x, y \rangle = \overline{\langle y,x \rangle}$ complex conjugation
2. $\langle x+y, z \rangle = \langle x, z \rangle + \langle y, z \rangle$
3. $\langle \Delta x, y \rangle = \lambda \langle x, y \rangle$ for any complex number $\lambda$
4. $\langle x, x \rangle \geq 0$ and $\langle x, x \rangle = 0$ if and only if $x=\theta$ (the null element)

Such a normed linear space will contain all of its limit points (convergent sequences of points in the space converge to members of the space). Ordinarily skilled artisans may recognize such spaces as Hilbert spaces.

One exemplary norm is the two-norm: $\|x\|_2 = \sqrt{\langle x,x \rangle}$ for $x \in X$. In order to avoid the square root, it is appropriate to discuss the two-norm squared: $\|x\|_2^2 = \langle x, x \rangle$ This definition satisfies all three of the rules mentioned above for x as an N-dimensional vector or for x(t) as a function defined on a finite interval, say $t \in [0, 1]$.

One challenge which aspects of the present invention address is the construction of a satisfactory approximation in the presence of noise. It is undesirable to reproduce noisy values, but it is desirable to traverse past those values in a smooth sense relative to a covariance of their uncertainty. The central limit theorem provides that, statistically speaking, the more samples that are available to estimate a mean, the less uncertainty exists in that estimate. In a similar fashion, it can be desirable to have more than N samples to robustly model an Nth order fit (the more samples, the better). The result may not fit all of the data points perfectly. Rather, the result may trace a curve near to them (within the span of the basis functions).

In this construct, there are more equations than unknowns. As a result, there usually is no solution that will exactly satisfy all of the equations. In fact, the data may not be in the span of the solution space at all. In such an event, the least squares solution offers a compromise that minimizes the mean square error between the data, y, and the solution space, and provides a best fit solution.

The best fit solution to a given problem generally will produce results that live in the span of a particular basis. There may be additional requirements that would be desirable to impose to constrain the solution further, or to penalize undesirable behavior. For example, it may be desirable to fit the data, but it also may be desirable to sacrifice some data discrepancy in order to have a solution that promotes smoothness.

For a nonlinear vector valued function taking vector inputs, F(x); data representing the value of F(x) for some unknown input x; and an initial estimate of the solution, $x_0$, it may be desirable to find an improvement to this estimate, $x_1 = x_0 + \delta x$. Using the initial estimate, a first order Taylor series of F and its Jacobean (matrix valued derivative) evaluated at $x_0$, namely $\partial F|_{x_0}$, can be constructed:

$$F(x) \approx F(x_0) + \partial F|_{x_0} \delta x$$

This step, called linearization, follows a theory that, within a small enough neighborhood of any point, $x_0$, all well behaved functions can be approximated by a linear one by projection to a local hyperplane. It then is possible to solve for a candidate perturbation improvement by solving $\partial F|_{x_0} \delta x = F(x) - F(x_0)$ and assigning $x_1 = x_0 + \lambda \delta x$, where $\lambda$ is a relaxation parameter between zero and one based on the strength of the nonlinearity in F.

Next, a residual, $r(x_1) = F(x) - F(x_1)$, may be evaluated. If a magnitude of the residual is small enough, the evaluation process can end. If the residual is not small enough, $x_1$ may be reset to $x_0$, and the process can be repeated. This process may continue iteratively until a magnitude of the residual is less than any required or desired threshold tolerance for solution accuracy.

Equations 7, 8, and 9 above arise from kinematic requirements. As has been noted, it is desirable to approximate nonlinearity in trajectory kinematics accurately, but not too accurately, enabling maintenance of position reasonably within lane delineators while at the same time not performing control operations too frequently. One approach to this nonlinearity approximation is to employ a spline approximation for the heading, so as to derive linearized iterative improvements to the kinematic data discrepancy functional, on which iterations will be performed in order to arrive at the appropriate solution.

For equations 7, 8, and 9, then, if data samples are given at discrete times $E_j=E(t_j)$, $N_j=N(t_j)$, $U_j=U(t_j)$, $E_0$, $N_0$, $v(t)$ are known, and an initial estimate for the heading is expressed as $$\theta_0(t) = \sum_{k=1}^{N} a_k \psi_k(t) = \Psi a$$

and if the $\psi_k(t)$ are a set of interpolation basis functions (such as B-splines); $\Psi$ is a matrix whose columns are the basis vectors (which will be evaluated at the sample times of interest, $t_j$); and an improvement is sought along the lines of $\theta_1(t)=\theta_0(t)+\delta\theta$, where $\delta\theta=\Psi\delta a$, then $$E(t) = E_0 + \int_o^t v(\tau) \sin(\Psi a + \Psi \delta a) \, d\tau$$
$$= E_0 + \int_o^t v(\tau) (\sin(\Psi a)\cos(\Psi \delta a) + \sin(\Psi \delta a)\cos(\Psi a)) \, d\tau$$

and $$N(t) = N_0 + \int_o^t v(\tau) \cos(\Psi a + \Psi \delta a) d\tau$$
$$= N_0 + \int_o^t v(\tau) (\cos(\Psi a)\cos(\Psi \delta a) - \sin(\Psi \delta a)\sin(\Psi a)) \, d\tau$$

If the correction factor, $\delta a$, is small, then a small angle approximation, namely:

$$\lim_{x \to 0} \sin(x) = x, \lim_{x \to 0} \cos(x) = 1,$$

can be employed usefully to yield $$E(t) \approx E_0(t) + \int_o^t v(\tau)\cos(\Psi a)\Psi \delta a \, d\tau$$
$$N(t) \approx N_0(t) - \int_o^t v(\tau)\sin(\Psi a)\Psi \delta a \, d\tau$$

where $$E_0(t) = E_0 + v(\tau)\sin(\Psi a)d\tau$$
$$N_0(t) = N_0 + \int_o^t v(\tau)\cos(\Psi a)d\tau$$

The foregoing yields a linearized matrix problem for each time, $t_j$, to solve for the update given the state of the previous estimate:

$$\begin{bmatrix} \int_o^t v(\tau) \cos(\Psi a) \Psi d\tau \\ -\int_o^t v(\tau) \sin(\Psi a) \Psi d\tau \end{bmatrix} \delta a = \begin{bmatrix} E(t) - E_0(t) \\ N(t) - N_0(t) \end{bmatrix} \quad (13)$$

Figure 6:
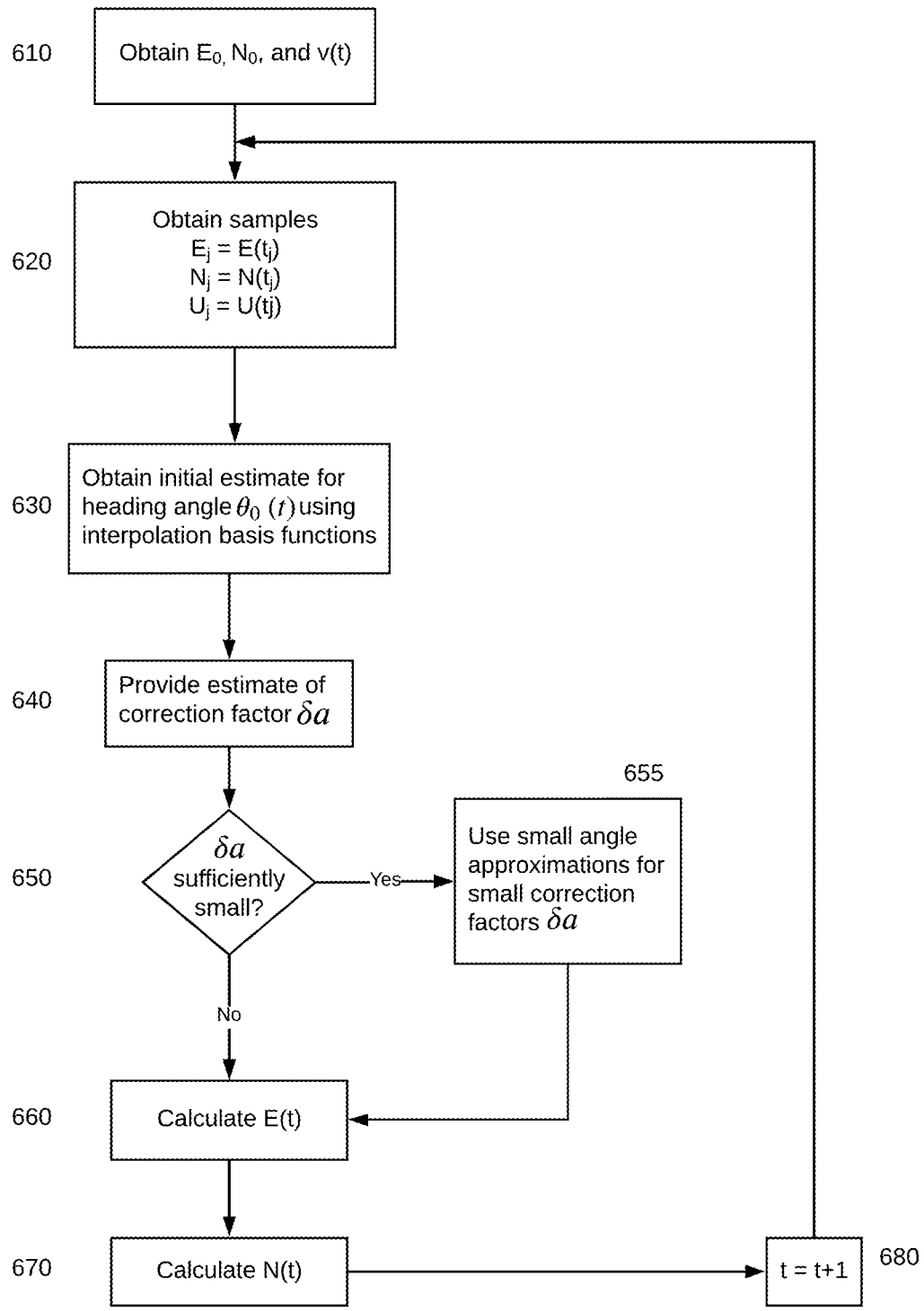
FIG. 6 is a flow chart showing aspects of the present invention according to an embodiment

FIG. 6 is a flow chart that steps through the preceding discussion as follows. At 610, initial estimates $E_0$, $N_0$, and $v(t)$ are obtained for time $t=0$. Then, at 620, samples $E_j=E(t_j)$, $N_j=N(t_j)$, and $U_j=U(t_j)$ are obtained. At 630, an initial heading estimate $\theta_0(t)$ is obtained, using interpolation basis functions which may be represented as $\psi_k(t)$. At 640, an estimated correction factor $\delta a$ is obtained. At 650, $\delta a$ is examined to see how small it is. If $\delta a$ is not too small, then at 660 and 670, respectively, $E(t)$ and $N(t)$ can be calculated. If $\delta a$ is sufficiently small, then at 655 a small angle approximation may be substituted. From there, at 660 and 670, respectively, $E(t)$ and $N(t)$ can be calculated. At 680, the flow returns to 620 for the next time increment $t=t+1$.

In view of the foregoing discussion of estimates of heading to produce trajectories that track closely the data points of interest (in an embodiment, data points one meter apart), it may be desirable to induce algorithmic behavior that gives to a produced trajectory a curvature that produces a comfortable ride. Small, rapid movements are of interest because, as discussed earlier, rapid adjustments, analogous to excessively frequent manipulation of a steering wheel, can cause an uncomfortable, if not rough, potentially nausea-inducing ride. It would be desirable to avoid unnecessary wiggles in curvature. One way of looking at these small, rapid movements is as a sort of discontinuity. One way of addressing this issue is to attempt to provide a more gradual transition for a temporal rate of change of the curvature along the produced trajectory. Often, there are bends in the road, surrounded by straight paths. Graceful transitions to such bends, followed by a return to center when the road straightens out, would be desirable.

Limiting the number of movements (wiggles) in number and magnitude yields bounded variations. Staying within the space of bounded variations makes it possible to obtain estimates that display smooth transitions, free of nonphysical oscillations. These techniques sometimes are referred to as total variation, or TV techniques, referred to earlier. Limiting the number of movements, and having bounded variations, makes it possible to produce sparse representations of the movements, embodying a technique called compressive sensing.

Employing a compressive sensing technique, in order to keep the representation of object movement within the bounded variations space, it is desirable to limit something called a TV semi-norm, which has the above-mentioned three requirements of a norm, except for uniqueness. For example, there can be multiple objects that produce a norm of zero.

Total-Variation of curvature of a trajectory with respect to the spline basis representation (and constant velocity) of the heading may be described as $$J(\kappa(t)) = \|\kappa\|_{BV} = 2\int_0^1 \left|\frac{d}{dt}\kappa(t)\right|dt = 2\int_0^1 \left|-\left(\frac{1}{v}\right)\frac{d^2\theta}{dt^2}\right|dt = \frac{2}{v}\int_0^1 |\partial^2 \Psi a| dt$$

where $\partial^2\Psi$ is a matrix whose columns are second derivatives of the spline basis functions. In an embodiment, the Gateaux derivative of this functional may be derived via the following equations:

$$\frac{\partial}{\partial\lambda}J(\kappa+\lambda h)|_{\lambda=0} = \frac{2}{\nu}\frac{\partial}{\partial\lambda}\int_0^1 \left[\partial^2\Psi(a+\lambda h)\overline{\partial^2\Psi(a+\lambda h)}\right]^{\frac{1}{2}}dt|_{\lambda=0} =$$

$$\frac{1}{\nu}\int_0^1 \frac{\partial^2\Psi a}{|\partial^2\Psi a|}\overline{\partial^2\Psi h} = \left\langle \frac{\partial^2\Psi a}{|\partial^2\Psi a|}, \partial^2\Psi h\right\rangle$$

These equations indicate that a sub-gradient, or extension of the concept of a unique gradient to a set of objects tangent to a manifold, for a TV semi-norm may be expressed as $$\partial J = \partial^2\Psi * [\partial^2\Psi a]^{-1}\partial^2\Psi a$$

where $[\partial^2\Psi a]^{-1}$ represents the inverse of the diagonal matrix of the values $\partial^2\Psi a$.

In attempting to obtain an update, $\delta a$, by setting $\partial J=0$, a gradient about the state, $a$, may be linearized by lagging the central nonlinear term as $$\partial^2\Psi * [\partial^2\Psi a]^{-1}\partial^2\Psi(a+\delta a) = 0$$

This relationship provides the linearized constraint equation $$\partial^2\Psi * [\partial^2\Psi a]^{-1}\partial^2\Psi \delta a = -\partial^2\Psi * [\partial^2\Psi a]^{-1}\partial^2\Psi a \quad (14)$$

One method to produce a trajectory that is close to the original data but has smooth curvature may involve combining equations 13 and 14 as shown in equation 15 below:

$$\begin{bmatrix} \int_o^\tau v(\tau)\cos(\Psi a)\Psi\,dt \\ -\int_o^\tau v(\tau)\sin(\Psi a)\Psi\,dt \\ \mu[\partial^2\Psi a]^{-\frac{1}{2}}\partial^2\Psi \end{bmatrix}\delta a = \begin{pmatrix} E(t)-E_0(t) \\ N(t)-N_0(t) \\ \mu[\partial^2\Psi a]^{-\frac{1}{2}}\partial^2\Psi a \end{pmatrix} \quad (15)$$

where the first two sets of equations serve to produce an improvement to the approximation of the heading to better match the original Easting and Northing data, the third set of equations with the factor $\mu$ serves to smooth the curvature, and $$[\partial^2\Psi a]^{-\frac{1}{2}}$$

represents the inverse of the square root of the diagonal matrix of the values $\partial^2\Psi a$. In an embodiment, this term may receive additional regularization to ensure that the denominator is not equal to zero at any sample point. Having such a zero value would cause a matrix singularity, which would make the numerical implementation fail.

In order to ensure a non-zero denominator, in an embodiment a small enough positive number may be added to the denominator so as to avoid a computer underflow and not affect the overall calculation. Merely by way of example, a function $f(x)=1/x$ may be replaced with $$\tilde{f}(x) = \frac{\text{sign}(x)}{\text{abs}(x)} + \beta,$$

where $\beta < 10^{16}$, so that for all normally expected values of x, the system can evaluate abs(x)+$\beta$ as abs(x) as the smallness of $\beta$ causes $\beta$ to be wiped out in the underflow. When abs(x) approaches $\beta$, however, then $\beta$ may dominate. This circumstance tends to occur infrequently. Counterbalancing this is that the numerator in more complicated functions also tends to zero, keeping the function well-behaved overall.

In an embodiment, the factor $\mu$ may be empirically selected to assure that the smoothness is acceptable. Empirical selection may be based on examples from actual data that the system expects to use. The algorithm may iterate in order to obtain an acceptable smoothness. For example, first, the algorithm may provide an estimate of the correction factor $\delta a$, and then may produce a correction $\hat{a}=a+\delta a$ and may update the pointwise estimate, $\hat{P}(t|\hat{a})=[E(t|\hat{a}), N(t|\hat{a}), U(t|\hat{a})]$. The algorithm then may compute the infinity norm of the residual mismatch, $\|P-\hat{P}\|_\infty$, to see if it is within a target accuracy threshold. If the norm is within the target accuracy threshold, the algorithm may return the new values for the position, trajectory, curvatures, heading, slope, and cross slope. If the norm is not within the target accuracy threshold, the algorithm provides a reset $a_0 \leftarrow \hat{a}$, $E_0(t)=\hat{E}(t)$, $\hat{N}_0(t)=\hat{N}(t)$, $U_0(t)=\hat{U}(t)$ and continues to iterate to update the correction factor $\delta a$.

There are circumstances in which stacking the TV constraint as in equation (15) can yield a very high condition number. This is because the TV constraint focuses on regularizing derivatives of functions. There can be literally an infinite number of functions that can have the same derivative (for example, adding a constant to a function and taking the derivative does not change the derivative, as the derivative of a constant is zero). The resulting projection matrix can have potentially an infinite number of solutions. To compensate for this circumstance, in an embodiment there may be a data discrepancy step, followed by a relaxed version of the TV step. The coefficient update then can be applied, or the infinity norm of the residual determine where to repeat the iteration can be checked.

In an embodiment, it may be determined which of these two methods converges more quickly in the context of road network publication.

Figure 7:
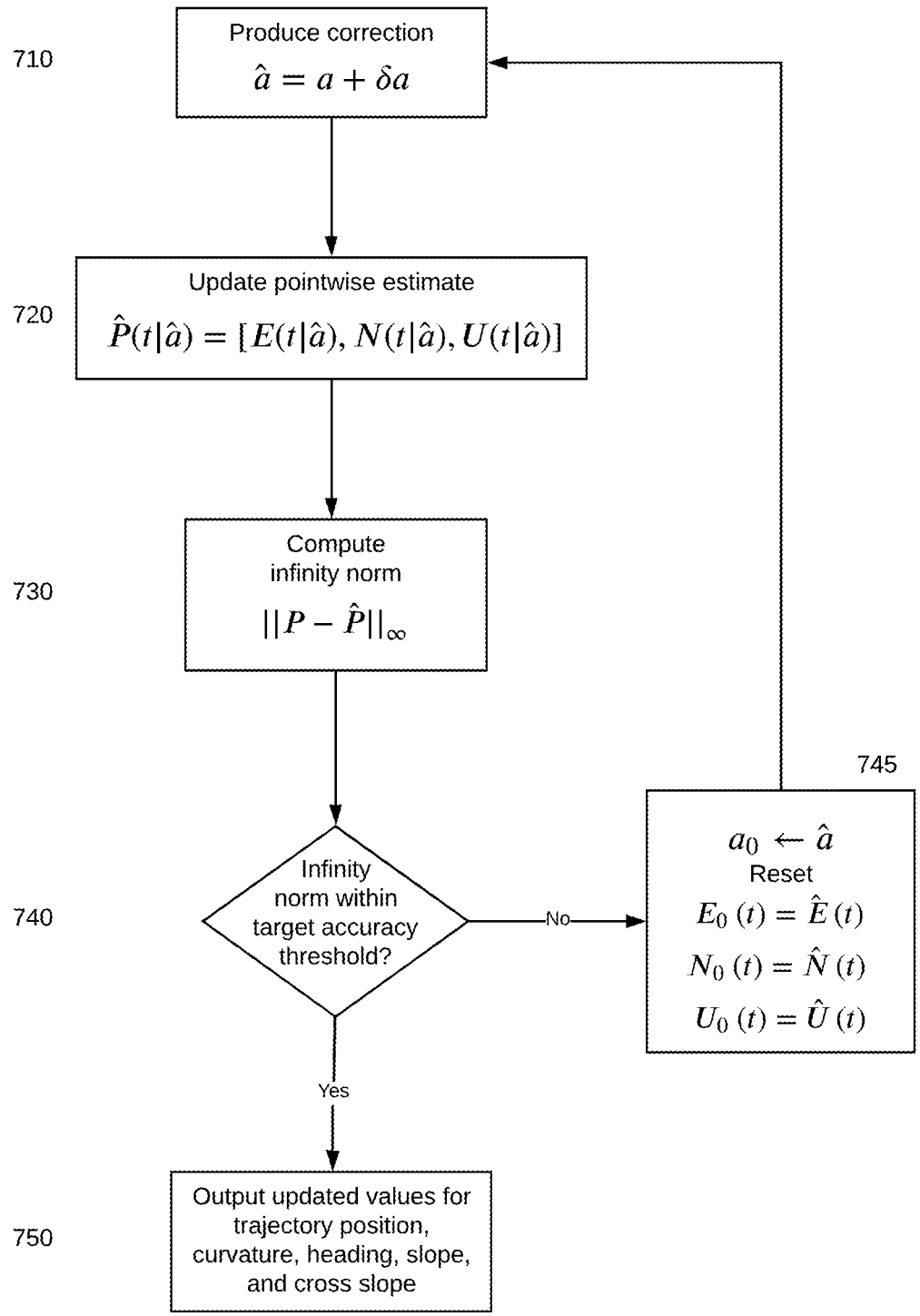
FIG. 7 is a flow chart showing aspects of the present invention according to an embodiment.

FIG. 7 is a flow chart summarizing the foregoing discussion according to an embodiment. At 710, a correction $\hat{a}=a+\delta a$ is produced. At 720, a pointwise estimate $\hat{P}(t|\hat{a})=[E(t|\hat{a}), N(t|\hat{a}), U(t|\hat{a})]$ is updated. At 730, the infinity norm is computed. At 740, if the infinity norm is within a target accuracy threshold, then at 750 updated values are output for position, trajectory, curvatures, heading, slope, and cross slope. If the norm is not within the target accuracy threshold, then at 745 there is a reset, and flow returns to 710 to continue to iterate.

In an embodiment, boundary conditions for curvature may be selected at endpoints of a trajectory by overriding values for the estimate at the end of each iteration. All of the values for curvature and heading should be pre-computed for the entire road network to be published. These values then may be applied to override the spline fit values at the endpoints of the approximation at the end of each iteration. Additionally, extra rows may be added to equation (15) to represent the fixed (static) values to be applied. These extra rows may be weighted accordingly to influence the model and to represent the desired values accurately. In an embodiment, the weighting may be empirical, based on actual use cases and data taken therefrom. It is within the contemplation of the invention to employ computationally-based methods to determine regularization parameters, taking into account computational expense and various cost functions, and attempting to account for edge cases. In an embodiment, when future data has characteristics within the general distribution of original data (for example, from original test cases), empirical weighting can perform adequately.

It is desired to build a spline basis in which the approximation has high fidelity for all points on a curve. Areas of high curvature (e.g. a hairpin turn) can be problematic. Accordingly, it may be desirable to build a spline basis whose knots are concentrated in those areas of high curvature. In this fashion, curvature may be adjusted smoothly going into the curve, and then can be held or altered appropriately throughout the hairpin. The knots may be chosen by defining a curvature driven density function and then using that density function to drive the knot selection. Then, for a stretch of highway, as shown in FIG. 3A for example, first curvature, $\kappa(t)$, is computed, as discussed earlier. The radius of curvature is $R(t)=1/\kappa(t)$.

In an embodiment, a next step is to compute a penalty function, $\rho(t)$, such as $$\rho(t) = \frac{1}{1 + \left(\frac{2}{2}\right)\tanh(\alpha(R-50)) + \left(\frac{3}{2}\right)\tanh(\alpha(R-300)) + \left(\frac{3}{2}\right)\tanh(\alpha(R-600)) + \left(\frac{11}{2}\right)\tanh(\alpha(R-900))}$$

In the foregoing formula, the penalty function is a smoothed version derived from a lookup table. In the foregoing formula, the numbers 50, 300, 600, and 900 derive from a desire to obtain specific behavior within certain bands of radius of curvature R. That is, 0-50 m, 50-300 m, 300-600 m, 600-900 m, and beyond. The constant multipliers for the various hyperbolic tangent functions may be empirically derived. For operations focusing on behavior in different radius of curvature bands, the just-mentioned numbers can be varied, as can the constant multipliers. There could be a larger or a smaller number of such bands, depending on the desired specific behavior to be obtained.

In an embodiment, a penalty function $\rho(t)$ may be based on power laws, for example, $\rho=\beta R^\gamma$, or logarithmic laws, for example $\rho=\log(1+\beta R^\gamma)$. In the foregoing, $\gamma$ is the power law exponent and $\beta$ is the power law gain, usually chosen empirically based on actual sample data.

In an embodiment, the penalty function should be high for small radius of curvature. This approach makes sense because in areas of small radius of curvature (high curvature), such as hairpin turns, varying from a centerline can be catastrophic.

In an embodiment, a next step is to assemble a cumulative density function, $F(t)$, $$F(t) = \frac{\int_0^t \rho(\tau)d\tau}{\int_{01} \rho(\tau)d\tau}$$

This way to generate a spline basis also leads to an efficient way to represent the data with less information, and as such is a form of compression. In an embodiment, it can be possible to represent the necessary data with as little as one percent of the information than would come from the usual one-meter sample points. An example of this data sparsity may be seen in FIG. 4, discussed earlier, which shows higher knot density in regions of high curvature and lower knot density in regions of low curvature (e.g. straighter areas). Resampling the spline representation produces accurate reconstruction, while not taking the trajectory outside of the lane delineators.

Figure 8:
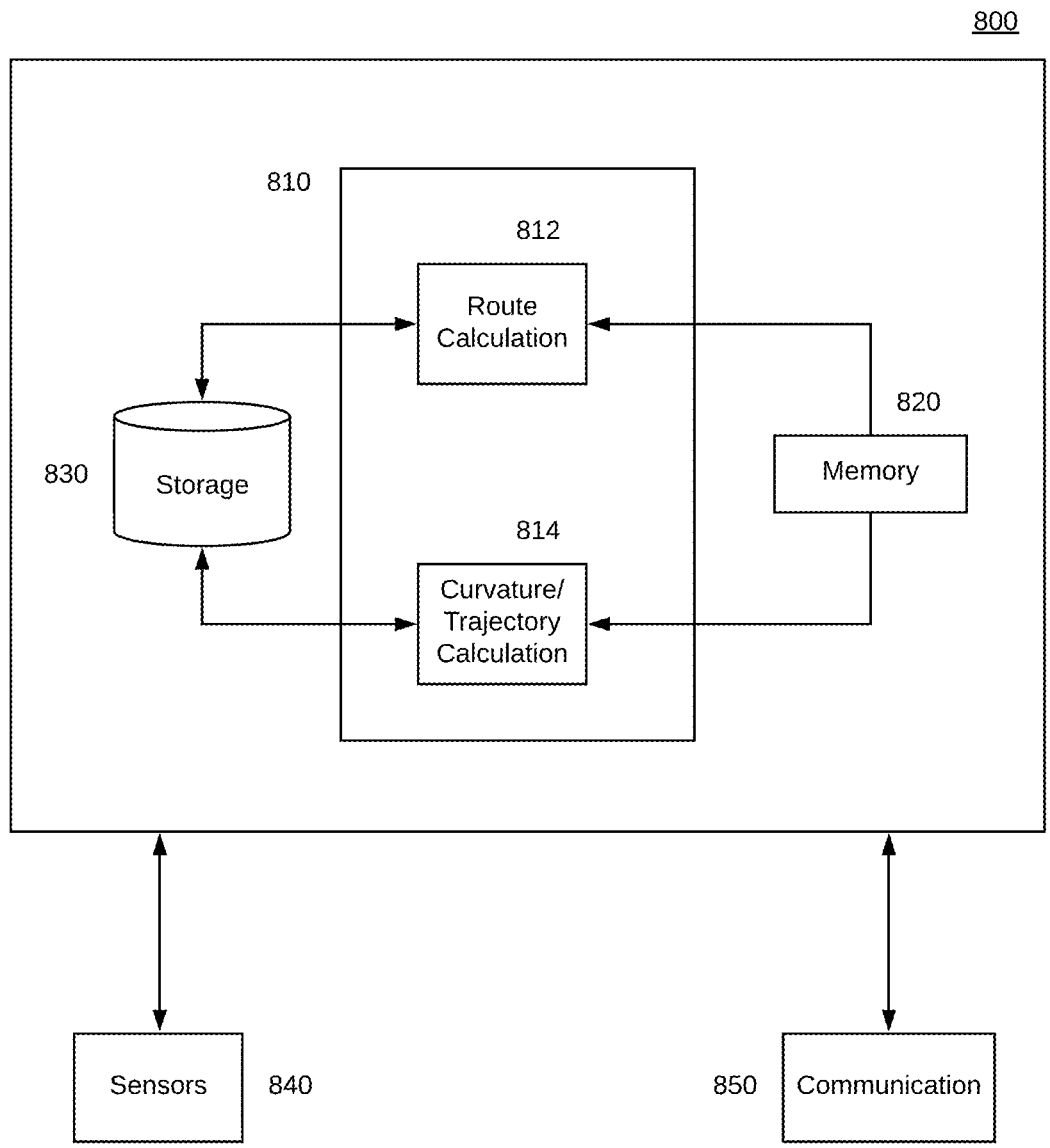
FIG. 8 is a high-level diagram of a system to implement aspects of the present invention according to an embodiment.

FIG. 8 is a high level diagram of a system 800 in accordance with an embodiment. A processor 810 interacts with non-transitory memory 820 and storage 830. Storage 830 may store standard definition (SD) maps as well as HD maps, with HD maps providing data for vehicle guidance in autonomous driving. In an embodiment, the non-transitory memory 820 may store a program which the processor 810 executes to perform route calculation 812 and curvature/trajectory calculation 814. The curvature/trajectory calculation 814 may be performed in accordance with various embodiments described herein.

Sensor apparatus 840 may include but are not limited to one or more of two-dimensional (2D) cameras, three-dimensional (3D) cameras, and other vision based sensors, light detection and ranging (LIDAR) sensors, sound navigation and ranging (SONAR) sensors, and ultrasonic sensors. The various sensors or cameras in sensor apparatus 840 may interact with system 800 to provide road related information, including but not limited to lane information, and route-related information.

Communications apparatus 850 may include but are not limited to one or more of a global positioning system (GPS), a general mobile radio service (GMRS) radio which may enable text messaging and/or receipt of GPS location information, one or more cellular communication radios such as 3G, 4G, 4G LTE, 5G, and future contemplated iterations, and/or one or more wireless data communications devices implementing some form of 802.11 technology or a variant thereof. Communications module 850 may interact with system 800 to provide GPS location information. Interaction between communications module 850 and system also may enable vehicle to vehicle (V2V) communication, vehicle to people (V2P) communication, and/or vehicle to infrastructure (V2I) communication.

In accordance with aspects of the invention, in the event that one or more of the sensors and/or cameras in sensor apparatus 840 becomes inoperative, it still may be possible to use GPS signals from communications module 850 and the curvature and trajectory information from system 800 to keep vehicles safely in their lanes while alerting drivers to malfunction. Drivers then can decide how to proceed (that is, by continuing autonomous vehicle control, or taking over operation of the vehicle manually).

In an embodiment, the inventive method has achieved results reflecting an average of 2.6 cm of positional error at ~98% compression, and less than 1 cm of positional error at ~90% compression. With the inventive technique, it is possible to take advantage of tradeoffs between data representation size and accuracy. These results compare favorably with various known lossier compression algorithms such as Uniform Sample, Douglas-Peucker (DP), Time Ratio (TR), Speed Based (SP), Time Ratio Speed Based (TR_SP) and Speed Based Time Ratio (SP_TR), which can average 22 cm of error at a similar compression level. Fundamentally, the inventive techniques in accordance with aspects of the present invention provide superior results because the techniques do not involve merely downsampling or resampling followed by upsampling. Aspects of the inventive techniques are akin to storing polynomial coefficients. As a general example, if a very large number of points can be modeled well by a polynomial equation with N terms and N coefficients, storing the N coefficients is more efficient than any linearly-informed decimation of all of those points.

Aspects and embodiments of the present invention include, but are not limited to the following:

CLAUSE 1. In autonomous vehicle control, a trajectory smoothing method comprising:
- responsive to route selection, identifying a trajectory;
- computing a curvature and/or variation of curvature;
- responsive to curvature or variation of curvature being greater than a predetermined value, performing interpolation to represent trajectory;
- applying compressive sensing to provide control signals; and
- outputting the control signals to enable control of the autonomous vehicle.

CLAUSE 2. The method of clause 1, further comprising:
- responsive to curvature or variation of curvature not being greater than the predetermined value, outputting the control signals.

CLAUSE 3. The method of clause 1 or clause 2, further comprising:
- responsive to availability of updated data for the selected route, updating the route data prior to identifying the trajectory.

CLAUSE 4. The method of any preceding clause, wherein computing the curvature comprises:
- obtaining initial coordinate values and velocity;
- selecting samples of the coordinate values at time t;
- estimating a heading angle using interpolation basis functions;
- estimating a correction factor;
- applying the correction factor to provide corrected coordinate values; and
- repeating the selecting, estimating, and applying at an incremented time.

CLAUSE 5. The method of clause 4, further comprising:
- responsive to the correction factor being less than a predetermined value, using a small angle approximation as the correction factor before providing the corrected coordinate values.

CLAUSE 6. The method of clause 4 or clause 5, wherein the interpolation basis functions comprise basis splines.

CLAUSE 7. The method of any preceding clause, wherein the applying the compressive sensing comprises:
- responsive to computing the curvature or variation in curvature, computing a penalty function for deviation from the curvature or variation in curvature; and
- computing a cumulative density function related to the penalty function.

CLAUSE 8. The method of clause 7, wherein the penalty function is $$\rho(t) = \frac{1}{1 + \left(\frac{2}{2}\right)\tanh(\alpha(R-50)) + \left(\frac{3}{2}\right)\tanh(\alpha(R-300)) + \left(\frac{3}{2}\right)\tanh(\alpha(R-600)) + \left(\frac{11}{2}\right)\tanh(\alpha(R-900))}$$

CLAUSE 9. The method of clause 7 or clause 8, wherein the cumulative density function is $$F(t) = \frac{\int_0^t \rho(\tau)d\tau}{\int_{01} \rho(\tau)d\tau}$$

CLAUSE 10. The method of any preceding clause, wherein computing the curvature or variation in curvature comprises computing a trajectory curvature $$\frac{d\theta}{dt} = -v(t)\kappa(t) \text{ where } \frac{d\theta}{dt}$$

is a change of heading with time;
v(t) is velocity as a function of time; and
κ(t) is curvature.

CLAUSE 11. The method of any of clauses 1 to 9, wherein computing the curvature and/or variation of curvature comprises computing a trajectory curvature $$\frac{d\theta}{ds} = -\kappa(s) \text{ where } \frac{d\theta}{ds}$$

is a change of heading with respect to arc-length;
s is arc-length; and
κ(S) is curvature.

CLAUSE 12. The method of clause 6, wherein the basis splines comprise a series of knots which are ordered points in a domain.

CLAUSE 13. The method of clause 12, wherein the knots have a higher density in areas of higher curvature or variation of curvature, and a lower density in areas of lower curvature or variation of curvature.

CLAUSE 14. The method of any preceding clause, further comprising:
- producing GPS signals; and
- using the GPS signals with the control signals to output GPS-based control signals to enable control of the autonomous vehicle.

CLAUSE 15. The method of any preceding clause, further comprising:
- producing sensing signals; and
- using the sensing signals with the control signals to output sensor-based control signals to enable control of the autonomous vehicle.

CLAUSE 16. The method of clause 15, further comprising:
- using the GPS signals and the sensing signals to output GPS and sensor-based control signals to enable control of the autonomous vehicle.

CLAUSE 17. A autonomous vehicle control system comprising:
- a processor; and
- a non-transitory storage medium storing program instructions which, when executed by the processor, perform a trajectory smoothing method comprising:
  - responsive to route selection, identifying a trajectory;
  - computing a curvature and/or variation of curvature;
  - responsive to curvature or variation of curvature being greater than a predetermined value, performing interpolation to represent trajectory;
  - applying compressive sensing to produce control signals; and
  - outputting the control signals to enable control of the autonomous vehicle.

CLAUSE 18. The system of clause 17, wherein the method further comprises:
- responsive to curvature or variation of curvature not being greater than the predetermined value, outputting the control signals.

CLAUSE 19. The system of clause 17 or clause 18, wherein the method further comprises:
responsive to availability of updated data for the selected route, updating the route data prior to identifying the trajectory.

CLAUSE 20. The system of any of clauses 17 to 19, wherein computing the curvature and/or variation of curvature comprises:
obtaining initial coordinate values and velocity;
selecting samples of the coordinate values at time t;
estimating a heading angle using interpolation basis functions;
estimating a correction factor;
applying the correction factor to provide corrected coordinate values; and repeating the selecting, estimating, and applying at an incremented time.

CLAUSE 21. The system of clause 20, wherein the method further comprises:
responsive to the correction factor being less than a predetermined value, using a small angle approximation as the correction factor before providing the corrected coordinate values.

CLAUSE 22. The system of clause 20 or clause 21, wherein the interpolation basis functions comprise basis splines.

CLAUSE 23. The system of any of clauses 17 to 22, wherein the applying the compressive sensing comprises:
responsive to computing the curvature and/or variation of curvature, computing a penalty function for deviation from the curvature or variation of curvature; and
computing a cumulative density function related to the penalty function.

CLAUSE 24. The system of clause 23, wherein the penalty function is a smoothed version derived from a lookup-table, such as $$\rho(t) = \frac{1}{1 + \left(\frac{2}{2}\right)\tanh(\alpha(R-50)) + \left(\frac{3}{2}\right)\tanh(\alpha(R-300)) + \left(\frac{3}{2}\right)\tanh(\alpha(R-600)) + \left(\frac{11}{2}\right)\tanh(\alpha(R-900))}$$

CLAUSE 25. The system of clause 23 or clause 24, wherein the cumulative density function is $$F(t) = \frac{\int_0^t \rho(\tau)d\tau}{\int_{01} \rho(\tau)d\tau}$$

CLAUSE 26. The system of any of clauses 17 to 25, wherein computing the curvature and/or variation of curvature comprises computing a trajectory curvature $d\theta/dt = -v(t)\kappa(t)$ where $d\theta/dt$ is a change of heading with time;
$v(t)$ is velocity as a function of time; and
$\kappa(t)$ is curvature.

CLAUSE 27. The system of clauses 17 to 25, wherein computing the curvature and/or variation of curvature comprises computing a trajectory curvature $d\theta/ds = -\kappa(s)$ where $d\theta/ds$ is a change of heading with arc-length;
s is arc-length; and
$\kappa(s)$ is curvature.

CLAUSE 28. The system of clause 22, wherein the basis splines comprise a series of knots which are ordered points in a domain.

CLAUSE 29. The system of clause 28, wherein the knots have a higher density in areas of higher curvature or variation of curvature, and a lower density in areas of lower curvature or variation of curvature.

CLAUSE 30. The system of any of clauses 17 to 29, further comprising communications apparatus to produce GPS signals which the processor uses with the control signals to output GPS-based control signals to enable control of the autonomous vehicle.

CLAUSE 31. The system of any of clauses 17 to 30, further comprising sensor apparatus to produce sensing signals with the processor uses with the control signals to output sensor-based control signals to enable control of the autonomous vehicle.

CLAUSE 32. The system of clause 31, wherein the processor uses the GPS signals and the sensing signals to output GPS and sensor-based control signals to enable control of the autonomous vehicle.

While the foregoing describes one or more embodiments in accordance with aspects of the disclosed invention, various modifications within the scope and spirit of the invention will be apparent to ordinarily skilled artisans. Consequently, only the following claims limit the invention's scope.

What is claimed is:

1. In autonomous vehicle control, a trajectory smoothing method comprising: responsive to route selection, identifying a trajectory; computing a curvature and/or variation of curvature of the trajectory; responsive to curvature or variation of curvature being greater than a predetermined value, performing interpolation to represent the trajectory; applying compressive sensing to provide control signals; and outputting the control signals which control the autonomous vehicle.

2. The method of claim 1, further comprising:
responsive to availability of updated data for the selected route, updating the route data prior to identifying the trajectory.

3. The method of claim 1, wherein computing the curvature or variation of curvature comprises:
obtaining initial coordinate values and velocity;
selecting samples of the coordinate values at time t;
estimating a heading angle using interpolation basis functions;
estimating a correction factor;
applying the correction factor to provide corrected coordinate values; and
repeating the selecting, estimating, and applying at an incremented time.

4. The method of claim 3, further comprising:
responsive to the correction factor being less than a predetermined value, using a small angle approximation as the correction factor before providing the corrected coordinate values.

5. The method of claim 3, wherein the interpolation basis functions comprise basis splines, wherein the basis splines comprise a series of knots which are ordered points in a domain, wherein the knots have a higher density in areas of higher curvature or variation of curvature, and a lower density in areas of lower curvature or variation of curvature.

6. The method of claim 1, wherein the applying the compressive sensing comprises:
responsive to computing the curvature or variation in curvature, computing a penalty function for deviation from the curvature or variation in curvature; and
computing a cumulative density function related to the penalty function.

7. The method of claim 6, wherein the penalty function is $$\rho(t) = \frac{1}{1+\left(\frac{2}{2}\right)\tanh(\alpha(R-50))+\left(\frac{3}{2}\right)\tanh(\alpha(R-300))+\left(\frac{3}{2}\right)\tanh(\alpha(R-600))+\left(\frac{11}{2}\right)\tanh(\alpha(R-900))}.$$

8. The method of claim 6, wherein the cumulative density function is $$F(t) = \frac{\int_0^t \rho(\tau)d\tau}{\int_{01} \rho(\tau)d\tau}.$$

9. The method of claim 1, wherein computing the curvature or variation in curvature comprises computing a trajectory curvature selected from the group consisting of $$\frac{d\theta}{dt} = -v(t)\kappa(t) \text{ where } \frac{d\theta}{dt}$$

is a change of heading with time;
v(t) is velocity as a function of time; and
κ(t) is curvature; or $$\frac{d\theta}{ds} = -\kappa(s) \text{ where } \frac{d\theta}{ds}$$

is a change of heading with respect to arc-length;
s is arc-length; and
κ(s) is curvature.

10. The method of claim 1, further comprising:
producing one of GPS signals or sensing signals; and
using the one of the GPS signals or the sensing signals with the control signals to output GPS-based control signals to enable control of the autonomous vehicle.

11. An autonomous vehicle control system comprising: a processor; and a non-transitory storage medium storing program instructions which, when executed by the processor, perform a trajectory smoothing method comprising: responsive to route selection, identifying a trajectory; computing a curvature and/or variation of curvature of the trajectory; responsive to curvature or variation of curvature being greater than a predetermined value, performing interpolation to represent the trajectory; applying compressive sensing to produce control signals; and outputting the control signals which control the autonomous vehicle.

12. The system of claim 11, wherein the method further comprises:
responsive to availability of updated data for the selected route, updating the route data prior to identifying the trajectory.

13. The system of claim 11, wherein computing the curvature and/or variation of curvature comprises:
obtaining initial coordinate values and velocity;
selecting samples of the coordinate values at time t;
estimating a heading angle using interpolation basis functions;
estimating a correction factor;
applying the correction factor to provide corrected coordinate values; and
repeating the selecting, estimating, and applying at an incremented time.

14. The system of claim 13, wherein the method further comprises:
responsive to the correction factor being less than a predetermined value, using a small angle approximation as the correction factor before providing the corrected coordinate values.

15. The system of claim 11, wherein the interpolation basis functions comprise basis splines, wherein the basis splines comprise a series of knots which are ordered points in a domain, wherein the knots have a higher density in areas of higher curvature or variation of curvature, and a lower density in areas of lower curvature or variation of curvature.

16. The system of claim 11, wherein the applying the compressive sensing comprises:
responsive to computing the curvature and/or variation of curvature, computing a penalty function for deviation from the curvature or variation of curvature; and
computing a cumulative density function related to the penalty function.

17. The system of claim 16, wherein the penalty function is a smoothed version derived from a lookup-table, such as $$\rho(t) = \frac{1}{1+\left(\frac{2}{2}\right)\tanh(\alpha(R-50))+\left(\frac{3}{2}\right)\tanh(\alpha(R-300))+\left(\frac{3}{2}\right)\tanh(\alpha(R-600))+\left(\frac{11}{2}\right)\tanh(\alpha(R-900))}.$$

18. The system of claim 17, wherein the cumulative density function is $$F(t) = \frac{\int_0^t \rho(\tau)d\tau}{\int_{01} \rho(\tau)d\tau}.$$

19. The system of claim 11, wherein computing the curvature and/or variation of curvature comprises computing a trajectory curvature selected from the group consisting of $$d\theta/dt = -v(t)\kappa(t)$$

where dθ/dt is a change of heading with time;
v(t) is velocity as a function of time; and
κ(t) is curvature; or $$d\theta/ds = -\kappa(s)$$

where dθ/ds is a change of heading with arc-length;
s is arc-length; and
κ(s) is curvature.

20. The system of claim 11, further comprising one of communications apparatus or sensor apparatus to produce one of GPS signals or sensing signals which the processor uses with the control signals to output GPS-based control signals to enable control of the autonomous vehicle.

\* \* \* \* \*